Jan. 31, 1967  E. N. OELAND, JR  3,301,210
PROPELLER ASSEMBLY DRIVE
Filed Jan. 17, 1966
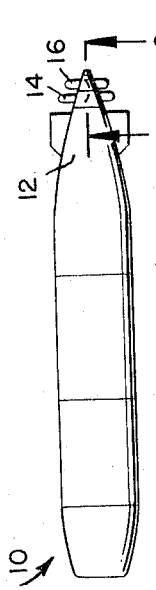
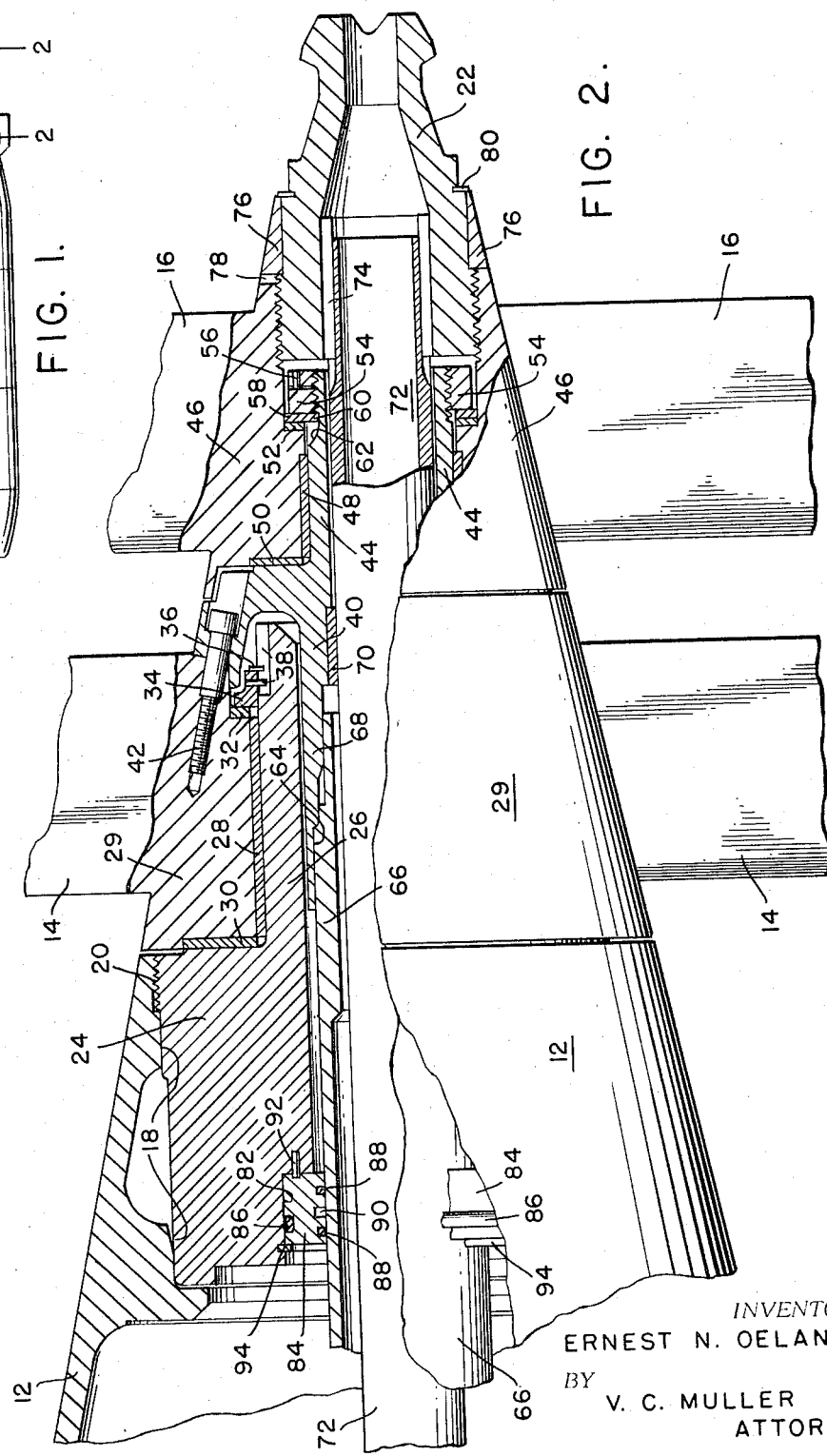
INVENTOR.
ERNEST N. OELAND, JR.
BY
V. C. MULLER
ATTORNEY.

United States Patent Office 3,301,210
Patented Jan. 31, 1967

3,301,210
PROPELLER ASSEMBLY DRIVE
Ernest N. Oeland, Jr., West Covina, Calif., assignor to the United States of America as represented by the Secretary of the Navy
Filed Jan. 17, 1966, Ser. No. 521,223
6 Claims. (Cl. 114—20)

This invention relates to torpedoes and more particularly to improvements in their tail cone sections and associated propeller driving mechanism.

In a torpedo of the aerial launched type it is common practice to stabilize it during descent by a parachute which is released when the torpedo enters the sea, as exemplified by the patent to Karp 3,153,395 and the Bemis and Kilvert patents referred to therein. At the time of parachute opening, shortly after launching, the rearward or snatch force applied to the torpedo by the parachute may not be axially aligned with the torpedo axis which applies a moment to the coaxial propeller shafts tending to bend or rupture them. Additionally, the propeller shaft to which the rear propeller is affixed is subjected to a tension force. It becomes apparent, accordingly, that the propeller shafts must be designed to withstand the sudden shock or snatch force of the parachute, necessitating shafts of larger size and strength than would be required for transmitting only torque forces to the propellers after the propeller starts its run in the sea.

One of the objects of the invention is to provide a torpedo propeller support and drive shaft assembly in which the drive shafts are not subjected to parachute snatch forces.

Another object, consonant with the foregoing object, is to subject the shafts to only torque forces, permitting reduction in their size and strength.

Another object is to transmit parachute snatch forces directly to the torpedo tail cone through the propeller hubs.

Another object is to obviate the use of anti-friction bearings, formerly employed, together with their seals.

Another object is to simplify the assembly and disassembly of the propulsion motor and its driven shafts to or from the tail cone section.

A further object is to provide a tail cone sub-assembly which may replace a present sub-assembly.

Still further objects, advantages and salient features will become apparent from the description to follow, the accompanying drawing and the appended claims, in which:

FIG. 1 is a side elevation of an air launched, parachute stabilized torpedo, and FIG. 2 is an enlarged longitudinal section taken on line 2—2, FIG. 1, portions being shown in side elevation.

Referring now to the drawing, and first to FIG. 1, torpedo 10 comprises a plurality of aligned hull sections, secured together in any manner well known in the art, the rearmost or tailcone section 12 containing the propulsion engine or motor (not shown) which rotates a pair of propellers 14, 16 in opposite directions, thus nullifying any torque forces about the torpedo axis.

Referring now to FIG. 2, tail cone section 12 is provided with a bore 18 with threads 20 which, in a prior art torpedo over which this invention is an improvement, receives a bearing housing from which a pair of coaxial propeller shafts project and to which are affixed, by suitable splines and nuts, a pair of propellers. The blades of the propellers are the same as shown and located in the same position as shown but are supported directly by propeller shafts which project rearwardly from the bearing housing. The shaft for the rear propeller is provided with a propeller nut similar to nut 22 to which is affixed a parachute release mechanism. As will be apparent, the propeller shafts of the prior art just described are subjected to bending moment by the parachute snatch force when the force is applied at an angle to the torpedo axis.

In the present invention, a propeller support 24 replaces the bearing housing previously referred to. Its forward portion is identical to the prior art bearing housing so that it fits bore 18 and threads 20. It otherwise differs as will now be described.

Propeller shaft support 24 is provided with a cylindrical projection 26 on which propeller 14 is journaled. Support 24 and projection 26 may be constructed of aluminum and projection 26 is preferably anodized to provide a hard bearing surface. A bearing sleeve 28 is press fitted within the bore of propeller hub 29 and thrust washers 30, 32 are cemented to its opposite end faces. The bearing sleeve and thrust washers are preferably "DU" self-lubricating material, manufactured by Garlock, Inc., consisting of glacier TFE fluorocarbon resin, lead, porous bronze and steel. The only other lubrication on their bearing surfaces is sea water. A thrust collar 34 abuts washer 32 and is retained on projection 26 by snap ring 36, and pin and slot arrangement 38, preventing rotation of the thrust collar.

A torque collar 40, formed of stainless steel, is secured to hub 29 by a plurality of angularly spaced screws 42 and is provided with a cylindrical propeller support 44 on which rear propeller 16 is journaled. Hub 46 of the rear propeller is provided with a sleeve 48 and thrust washers 50, 52 of the same material employed in the front propeller. A nut 54 threadedly engages the rear end of propeller support 44 and is locked against rotation in any suitable manner such as by a slot and set screw arrangement 56 which widens the slot and jams the threaded connection with support 44 when the set screw is rotated. A washer 58 is disposed between nut 54 and thrust washer 52 and is prevented from rotation by a tang 60 on the washer which engages slot 62. The tanged washer thus presents any tendency of the rotating propeller to rotate nut 54. The forward end of torque collar 40 is provided with a bore 64 which receives and aligns cylindrical outer drive shaft 66, this shaft being torque coupled to torque collar 40 by a spline connection 68. Rearwardly of the spline connection, torque collar 40 is provided with a bushing 70 in which inner drive shaft 72 is journaled. Nut 22 threadedly engages hub 46 and transmits torque from shaft 72 through a spline connection 74 and a collar 76, spline connected to nut 22 and having angularly spaced teeth 78 which engage like teeth on the rear end of hub 46. A conventional snap ring 80 retains collar 76 in its proper position. If desired, collar 76 may be omitted and a suitable shoulder may be provided on nut 22, engaging the rear end face of hub 46, the threads on nut 22 being so chosen that nut 22 tends to tighten when propeller driving torque is applied.

The front end of propeller support 24 is provided with a bore 82 which receives a collar 84 having an outer O-ring 86 and a pair of inner O-rings 88. An annular groove 90 is disposed between the inner pair of O-rings and is filled with a suitable lubricant. A pin 92 prevents rotation of collar 84 and the collar is retained in proper axial position by snap rings 94. The seal (not shown) between the inner and outer shaft is the same as the prior art and is located at a point adjacent the rear end of the propulsion engine.

In operation, it will be assumed that the torpedo has been dropped by an aircraft and the parachute has opened thus applying a sudden snatch force to propeller nut 22 through the propeller release mechanism (not shown). Nut 22 transmits this force to hub 46 through its threaded connector with the hub. The hub transmits the force through washer 58 and nut 54 to the rear end of torque collar 40. Torque collar 40 transmits the force through screws 42 to hub 29 of the forward propeller. Hub 29 then finally transmits the force to projection 26, support 24, threads 20 and tail cone 12 through thrust washer 34 and snap ring 36. As will now be apparent, the snatch force is transmitted from the parachute to tail cone 12 through the propeller hubs, rather than through the propeller drive shafts and their supporting bearings as has been the practice in the prior art referred to. Since the propeller shafts transmit only driving torque to the propellers, they may be designed for only this loading rather than for the loading of both snatch force and torque as was formerly the practice.

Obviously many modifications and variations of the present invention are possible in the light of the above teachings. It is therefore to be understood that within the scope of the appended claims the invention may be practiced otherwise than as specifically described.

What is claimed:

1. A torpedo tailcone and propeller drive assembly, comprising;
   (a) a cylindrical tubular stationary first journal forming a part of the tailcone,
   (b) a front propeller having a first hub with a plain cylindrical bearing surface therein rotatably mounted on said first journal,
   (c) a pair of plain thrust bearings, each having flat surfaces, disposed at opposite ends of the first hub, adapted to retain it against axial movement,
   (d) said first hub having a rearwardly extending torque collar rigidly affixed thereto for rotation therewith and including a tubular second journal,
   (e) a rear propeller having a second hub with a plain bearing surface therein rotatably mounted on said second journal,
   (f) a pair of like thrust bearings for retaining the second hub against axial movement.
   (g) a tubular outer drive shaft extending axially of the tailcone adapted to be rotated in one direction having a spline at its rear end drivingly connected to a portion of said torque collar,
   (h) an inner drive shaft disposed within the outer drive shaft adapted to be rotated in the opposite direction and having a spline at its rear end portion drivingly connected to the hub of said rear propeller,
   (i) the construction and arrangement being such that a rearward axial force applied to said second hub is transmitted through the rearmost thrust bearing to the torque collar and first hub, and thence through the rear thrust bearing for the front hub to the tailcone, the two named spline connections preventing such force from being transmitted to the two drive shafts.

2. Apparatus in accordance with claim 1 wherein the spline of the inner drive shaft is drivingly connected to the rear hub through a nut rotatable with the rear hub, said nut being constructed to releasably engage a parachute release mechanism.

3. Apparatus in accordance with claim 1 wherein the inner drive shaft is tubular to provide an exhaust conduit for the torpedo propulsion engine.

4. Apparatus in accordance with claim 1 wherein the torpedo tailcone and drive assembly is so constructed to be attached to a torpedo tailcone in lieu of a similar assembly having drive shafts which transmit said axial force to the tailcone, whereby an existing tailcone may be retrofitted by said apparatus.

5. Apparatus in accordance with claim 1 wherein the outer surface of said first hub, the outer surface of said torque collar, and the outer surface of said second hub form a rearwardly inwardly tapering frusto-conical surface.

6. Apparatus in accordance with claim 1 wherein all of the plain bearings are of self-lubricating material.

No references cited.

BENJAMIN A. BORCHELT, *Primary Examiner.*

P. A. SHANLEY, *Assistant Examiner.*